US006742186B1

United States Patent
Roeck

(10) Patent No.: US 6,742,186 B1
(45) Date of Patent: May 25, 2004

(54) METHOD AND APPARATUS FOR ENHANCING PERIODIC RANGING FOR CABLE MODEMS

(75) Inventor: Guenter Roeck, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/324,366

(22) Filed: Jun. 2, 1999

(51) Int. Cl.[7] ............................................... H04N 7/173
(52) U.S. Cl. ........................................ 725/111; 370/449
(58) Field of Search ........................ 725/111; 370/449, 370/489; 340/823.08; 375/222

(56) References Cited

U.S. PATENT DOCUMENTS

| | | | | |
|---|---|---|---|---|
| 5,946,322 A | * | 8/1999 | Moura et al. ................ | 370/468 |
| 6,006,017 A | * | 12/1999 | Joshi et al. ................. | 709/224 |
| 6,114,968 A | * | 9/2000 | Ramakrishnan et al. ... | 340/3.51 |
| 6,160,843 A | * | 12/2000 | McHale et al. ............. | 375/222 |
| 6,173,323 B1 | * | 1/2001 | Moghe ........................ | 709/224 |
| 6,230,326 B1 | * | 5/2001 | Unger et al. ................ | 725/111 |
| 6,453,472 B1 | * | 9/2002 | Leano et al. ................ | 725/111 |
| 6,507,565 B1 | * | 1/2003 | Taylor ........................ | 370/252 |
| 6,588,016 B1 | * | 7/2003 | Chen et al. ................. | 725/111 |
| 6,615,161 B1 | * | 9/2003 | Carney et al. .............. | 702/186 |
| 6,621,827 B1 | * | 9/2003 | Rezvani et al. ............. | 370/449 |
| 6,654,957 B1 | * | 11/2003 | Moore et al. ............... | 725/111 |

OTHER PUBLICATIONS

Data–Over–Cable Service Interface Specification: Radio Frequency Interface Specification (SP–RFI–I04–980724), Jul. 1998, pp. 97–116, 125.*
Douglis, F. & Killian, T., Adaptive Modem Connection Lifetimes, 1999 USENIX Technical Conference, Jun. 1999.*

* cited by examiner

*Primary Examiner*—John Miller
*Assistant Examiner*—Scott Beliveau
(74) *Attorney, Agent, or Firm*—Beyer, Weaver & Thomas, LLP.; Mary R. Olynick, Esq.

(57) ABSTRACT

Disclosed is a cable modem termination system (CMTS) capable of outputting periodic ranging opportunities. The CMTS includes an upstream receiver and demodulator capable of receiving an upstream signal, a downstream transmitter and modulator capable of transmitting a downstream signal, and a processor. The processor is arranged to output a first periodic ranging opportunity after a first polling interval from the downstream transmitter and modulator and to output a second periodic ranging opportunity after a second polling interval if the upstream receiver has not received a periodic ranging request in response to the first periodic ranging opportunity, wherein the second polling interval is shorter than the first polling interval. In one implementation, the first polling interval plus the second polling interval are less than a disconnect interval after which a cable modem that is communicating with the upstream receiver disconnects.

65 Claims, 10 Drawing Sheets

METHOD AND APPARATUS FOR ENHANCING PERIODIC RANGING FOR CABLE MODEMS

BACKGROUND OF THE INVENTION

1. Field of the Invention

The present invention relates to transmitting data over existing cable television plants using cable modems. More specifically, it relates to determining when to perform periodic ranging between the cable modem and the head end.

2. Description of the Related Art

The cable TV industry has been upgrading its signal distribution and transmission infrastructure since the late 1980s. In many cable television markets, the infrastructure and topology of cable systems now include fiber optics as part of its signal transmission component. This has accelerated the pace at which the cable industry has taken advantage of the inherent two-way communication capability of cable systems. The cable industry is now poised to develop reliable and efficient two-way transmission of digital data over its cable lines at speeds orders of magnitude faster than those available through telephone lines, thereby allowing its subscribers to access digital data for uses ranging from Internet access to cablecommuting.

Originally, cable TV lines were exclusively coaxial cable. The system included a cable head end, i.e. a distribution hub, which received analog signals for broadcast from various sources such as satellites, broadcast transmissions, or local TV studios. Coaxial cable from the head end was connected to multiple distribution nodes, each of which could supply many houses or subscribers. From the distribution nodes, trunk lines (linear sections of coaxial cable) extended toward remote sites on the cable network. A typical trunk line is about 10 kilometers. Branching off of these trunk lines were distribution or feeder cables (40% of the system's cable footage) to specific neighborhoods, and drop cables (45% of the system's cable footage) to homes receiving cable television. Amplifiers were provided to maintain signal strength at various locations along the trunk line. For example, broadband amplifiers are required about every 2000 feet depending on the bandwidth of the system. The maximum number of amplifiers that can be placed in a run or cascade is limited by the build-up of noise and distortion. This configuration, known as tree and branch, is still present in older segments of the cable TV market.

With cable television, a TV analog signal received at the head end of a particular cable system is broadcast to all subscribers on that cable system. The subscriber simply needed a television with an appropriate cable receptor to receive the cable television signal. The cable TV signal was broadcast at a radio frequency range of about 60 to 700 MHz. Broadcast signals were sent downstream; that is, from the head end of the cable system across the distribution nodes, over the trunk line, to feeder lines that led to the subscribers. However, the cable system did not have the equipment necessary for sending signals from subscribers to the head end, known as return or upstream signal transmission. Not surprisingly, nor were there provisions for digital signal transmission either downstream or upstream.

In the 1980s, cable companies began installing optical fibers between the head end of the cable system and distribution nodes (discussed in greater detail with respect to FIG. 1). The optical fibers reduced noise, improved speed and bandwidth, and reduced the need for amplification of signals along the cable lines. In many locations, cable companies installed optical fibers for both downstream and upstream signals. The resulting systems are known as hybrid fiber-coaxial (HFC) systems. Upstream signal transmission was made possible through the use of duplex or two-way filters. These filters allow signals of certain frequencies to go in one direction and of other frequencies to go in the opposite direction. This new upstream data transmission capability allowed cable companies to use set-top cable boxes and allowed subscribers pay-per-view functionality, i.e. a service allowing subscribers to send a signal to the cable system indicating that they want to see a certain program.

In addition, cable companies began installing fiber optic lines into the trunk lines of the cable system in the late 1980s. A typical fiber optic trunk line can be up to 80 kilometers, whereas a typical coaxial trunk line is about 10 kilometers, as mentioned above. Prior to the 1990s, cable television systems were not intended to be general-purpose communications mechanisms. Their primary purpose was transmitting a variety of entertainment television signals to subscribers. Thus, they needed to be one-way transmission paths from a central location, known as the head end, to each subscriber's home, delivering essentially the same signals to each subscriber. HFC systems run fiber deep into the cable TV network offering subscribers more neighborhood specific programming by segmenting an existing system into individual serving areas between 500 to 2,000 subscribers. Although networks using exclusively fiber optics would be optimal, presently cable networks equipped with HFC configurations are capable of delivering a variety of high bandwidth, interactive services to homes for significantly lower costs than networks using only fiber optic cables.

FIG. 1 is a block diagram of a two-way hybrid fiber-coaxial (HFC) cable system utilizing a cable modem for data transmission. It shows a head end 102 (essentially a distribution hub) which can typically service about 40,000 subscribers. Head end 102 contains a cable modem termination system (CMTS) 104 connected to a fiber node 108 by pairs of optical fibers 106. The primary functions of the CMTS are (1) receiving signals from external sources 100 and converting the format of those signals, e.g., microwave signals to electrical signals suitable for transmission over the cable system; (2) providing appropriate Media Access Control (MAC) level packet headers (as specified by the MCNS standard discussed below) for data received by the cable system, (3) modulating and demodulating the data to and from the cable system, and (4) converting the electrical signal in the CMTS to an optical signal for transmission over the optical lines to the fiber nodes.

Head end 102 is connected through pairs of fiber optic lines 106 (one line for each direction) to a series of fiber nodes 108. Each head end can support normally up to 80 fiber nodes. Pre-HFC cable systems used coaxial cables and conventional distribution nodes. Since a single coaxial cable was capable of transmitting data in both directions, one coaxial cable ran between the head end and each distribution node. In addition, because cable modems were not used, the head end of pre-HFC cable systems did not contain a CMTS. Returning to FIG. 1, each of the fiber nodes 108 is connected by a coaxial cable 110 to two-way amplifiers or duplex filters 112 which permit certain frequencies to go in one direction and other frequencies to go in the opposite direction. Each fiber node 108 can normally service up to 500 subscribers. Fiber node 108, coaxial cable 110, two-way amplifiers 112, plus distribution amplifiers 114 along trunk line 116, and subscriber taps, i.e. branch lines 118, make up the coaxial distribution system of an HFC system. Subscriber tap 118 is connected to a cable modem 120. Cable modem 120 is, in turn, connected to a subscriber computer 122.

Recently, it has been contemplated that HFC cable systems could be used for two-way transmission of digital data. The data may be Internet data, digital audio, or digital video data, in MPEG format, for example, from one or more external sources 100. Using two-way HFC cable systems for transmitting digital data is attractive for a number of reasons. Most notably, they provide up to a thousand times faster transmission of digital data than is presently possible over telephone lines. However, in order for a two-way cable system to provide digital communications, subscribers must be equipped with cable modems, such as cable modem 120. With respect to Internet data, the public telephone network has been used, for the most part, to access the Internet from remote locations. Through telephone lines, data is typically transmitted at speeds ranging from 2,400 to 33,600 bits per second (bps) using commercial (and widely used) data modems for personal computers. Using a two-way HFC system as shown in FIG. 1 with cable modems, data may be transferred at speeds up to 10 million bps. Table 1 is a comparison of transmission times for transmitting a 500 kilobyte image over the Internet.

TABLE 1

Time to Transmit a Single 500 kbyte Image

| Telephone Modem (28.8 kbps) | 6–8 minutes |
|---|---|
| ISDN Line (64 kbps) | 1–1.5 minutes |
| Cable Modem (10 Mbps) | 1 second |

Furthermore, subscribers can be fully connected twenty-four hours a day to services without interfering with cable television service or phone service. The cable modem, an improvement of a conventional PC data modem, provides this high speed connectivity and is, therefore, instrumental in transforming the cable system into a full service provider of video, voice and data telecommunications services.

As mentioned above, the cable industry has been upgrading its coaxial cable systems to HFC systems that utilize fiber optics to connect head ends to fiber nodes and, in some instances, to also use them in the trunk lines of the coaxial distribution system. In way of background, optical fiber is constructed from thin strands of glass that carry signals longer distances and faster than either coaxial cable or the twisted pair copper wire used by telephone companies. Fiber optic lines allow signals to be carried much greater distances without the use of amplifiers (item 114 of FIG. 1). Amplifiers decrease a cable system's channel capacity, degrade the signal quality, and are susceptible to high maintenance costs. Thus, distribution systems that use fiber optics need fewer amplifiers to maintain better signal quality.

Digital data on the upstream and downstream channels is carried over radio frequency (RF) carrier signals. Cable modems are devices that convert digital data to a modulated RF signal and convert the RF signal back to digital form. The conversion is done at two points: at the subscriber's home by a cable modem and by a CMTS located at the head end. The CMTS converts the digital data to a modulated RF signal which is carried over the fiber and coaxial lines to the subscriber premises. The cable modem then demodulates the RF signal and feeds the digital data to a computer. On the return path, the operations are reversed. The digital data is fed to the cable modem which converts it to a modulated RF signal (it is helpful to keep in mind that the word "modem" is derived from modulator/demodulator). Once the CMTS receives the RF signal, it demodulates it and transmits the digital data to an external source.

As mentioned above, cable modem technology is in a unique position to meet the demands of users seeking fast access to information services, the Internet and business applications, and can be used by those interested in cable-commuting (a group of workers working from home or remote sites whose numbers will grow as the cable modem infrastructure becomes increasingly prevalent). Not surprisingly, with the growing interest in receiving data over cable network systems, there has been an increased focus on performance, reliability, and improved maintenance of such systems. In sum, cable companies are in the midst of a transition from their traditional core business of entertainment video programming to a position as a full service provider of video, voice and data telecommunication services. Among the elements that have made this transition possible are technologies such as the cable modem.

Before reliable two-way communication is achieved between the head end and the cable modem, a ranging process must be performed between the head end and the cable modem that wishes to communicate with the head end. The ranging process includes an initial ranging process to configure particular parameters of the cable modem for reliable communication. Specifically, the head end tells the cable modem what time slot of what frequency range the cable modem should use. Additionally, the head end specifies particular power adjustments for signals transmitted by the cable modem such that all of the cable modems that are currently communicating with the head end transmit signals to the head end at about the same power levels. Prior to adjustment, individual cable modems will transmit signals that are received by the head end at different power levels because of wide variances between the different signal paths between each cable modem and head end.

After the initial ranging process is complete and the cable modem is configured, the cable modem may begin transmitting data requests to the head end and the head end may begin transmitting data to the cable modem. However, a periodic ranging process is still desired to keep the cable modem configured within acceptable parameters.

The Data over Cable Service Interface Specification (DOCSIS) defines a standard for transmitting data over TV/HFC Cable. Specifically, DOCSIS requires periodic polling by the head end to give each connected cable modem the opportunity to perform periodic ranging. Additionally, this standard implies that periodic ranging opportunities should be transmitted at a time intervals that are less than 30 seconds.

Accordingly, each cable modem typically must receive an opportunity for periodic ranging at least every 30 seconds, or the cable modem automatically disconnects.

Head ends typically implement periodic polling at 10 second intervals such that at least three polling opportunities may be sent prior to the cable modem disconnecting. That is, a cable modem will typically lose connectivity if three opportunities are lost in a row (e.g., after 30 seconds has expired). Since some opportunities are lost, polling every 10 seconds increases the chances that at least one of the opportunities will be received by the cable modem prior to disconnecting.

Although this method results in fewer disconnects over a short period of time, it does not eliminate disconnect in the long run. That is, a cable modem is likely to disconnect at least once within several days when two polling opportunities in a row are lost. Polling every 10 seconds has other associated disadvantages. For example, since the head end may have to poll several cable modems every 10 seconds, this polling may take up significant processing and bandwidth resources.

Therefore, it would be desirable to provide improved mechanisms for facilitating periodic ranging for cable modems, while reducing the number and likelihood of cable modem disconnects.

SUMMARY OF THE INVENTION

Accordingly, the present invention provides an apparatus and method for facilitating periodic ranging by a cable modem. In general terms, an intelligent polling mechanism is implemented. The cable modem is polled at relatively long time intervals (e.g., 25 seconds) that approach the cable modem's disconnect interval (e.g., 30 seconds). When the cable modem does not respond to the opportunity to range (e.g., the opportunities has been lost), the cable modem is polled at relatively short time intervals (e.g., 1 second) so that the cable modem may be polled at least once more before disconnecting.

In one embodiment, a cable modem termination system (CMTS) capable of outputting periodic ranging opportunities is disclosed. The CMTS includes an upstream receiver and demodulator capable of receiving an upstream signal, a downstream transmitter and modulator capable of transmitting a downstream signal, and a processor. The processor is arranged to output a first periodic ranging opportunity after a first polling interval from the downstream transmitter and modulator and to output a second periodic ranging opportunity after a second polling interval if the upstream receiver has not received a periodic ranging request in response to the first periodic ranging opportunity, wherein the second polling interval is shorter than the first polling interval. In one implementation, the first polling interval plus the second polling interval are less than a disconnect interval after which a cable modem that is communicating with the upstream receiver disconnects.

In another embodiment, the invention pertains to a CMTS that includes an upstream receiver and demodulator capable of receiving an upstream signal, a downstream transmitter and modulator capable of transmitting a downstream signal, and a processor arranged to output a plurality of periodic ranging opportunities from the downstream transmitter such that each periodic ranging opportunity is output after a first polling interval. The processor is also arranged to discontinue the periodic ranging opportunity being output at the first polling interval and output the periodic ranging opportunity from the downstream transmitter such that each periodic ranging opportunity is output after a second polling interval that differs from the first polling interval after the upstream receiver fails to receive a periodic ranging request in response to a periodic ranging opportunity and until it is determined that a periodic ranging request has been received by the upstream receiver. The processor is further arranged to discontinue the periodic ranging opportunities being output at the second polling interval and output the periodic ranging opportunities at a third polling interval that differs from the first and second polling intervals if a total loss time that is equal to a count of the consecutive periodic ranging opportunities being output at the second polling interval that fail to result in a periodic ranging request being received into the upstream receiver multiplied by the second polling interval plus the first polling interval is within a predetermined margin from a disconnect interval for disconnecting a cable modem the is communicating with the upstream receiver.

In a method aspect of the invention, a first periodic ranging opportunity is sent to a cable modem after a first polling interval, and a second periodic ranging opportunity is sent to the cable modem after a second polling interval if the cable modem has not sent a periodic ranging request in response to the first periodic ranging opportunity. In this embodiment, the second polling interval is shorter than the first polling interval.

In another method embodiment, a plurality of periodic ranging opportunities are sent to a cable modem such that each periodic ranging opportunity is sent after a first polling interval. The periodic ranging opportunities being sent at the first polling interval are discontinued and the periodic ranging opportunities are sent to the cable modem such that each periodic ranging opportunity is sent after a second polling interval that differs from the first polling interval after the cable modem fails to send a periodic ranging request in response to a periodic ranging opportunity and until it is determined that the cable modem has sent a periodic ranging request. The periodic ranging opportunities being sent at the second polling interval are discontinued and the periodic ranging opportunities are sent at a third polling interval that differs from the first and second polling intervals if a total loss time that is equal to a count of the consecutive periodic ranging opportunities being sent at the second polling interval that fail to result in a periodic ranging request from the cable modem multiplied by the second polling interval plus the first polling interval is within a predetermined margin from a disconnect interval for disconnecting the cable modem.

In yet another embodiment, the invention pertains to a computer readable medium that contains program instructions for sending a periodic ranging opportunity to a cable modem is disclosed. The computer readable medium includes computer readable code for sending a first periodic ranging opportunity to the cable modem after a first polling interval, and computer readable code for sending a second periodic ranging opportunity to the cable modem after a second polling interval if the cable modem has not sent a periodic ranging request in response to the first periodic ranging opportunity, wherein the second polling interval is shorter than the first polling interval.

In another embodiment, a computer readable medium includes computer readable code for sending a plurality of periodic ranging opportunities to the cable modem such that each periodic ranging opportunity is sent after a first polling interval, and computer readable code for discontinuing the periodic ranging opportunities being sent at the first polling interval and sending the periodic ranging opportunities to the cable modem such that each periodic ranging opportunity is sent after a second polling interval that differs from the first polling interval after the cable modem fails to send a periodic ranging request in response to a periodic ranging opportunity and until it is determined that the cable modem has sent a periodic ranging request. The computer readable medium further includes computer code for discontinuing the periodic ranging opportunities being sent at the second polling interval and sending the periodic ranging opportunities at a third polling interval that differs from the first and second polling intervals if a total loss time that is equal to a count of the consecutive periodic ranging opportunities being sent at the second polling interval that fail to result in a periodic ranging request from the cable modem multiplied by the second polling interval plus the first polling interval is within a predetermined margin from a disconnect interval for disconnecting the cable modem.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF SPECIFIC EMBODIMENTS

Reference will now be made in detail to specific embodiments of the invention. Examples of these embodiments are illustrated in the accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 2:
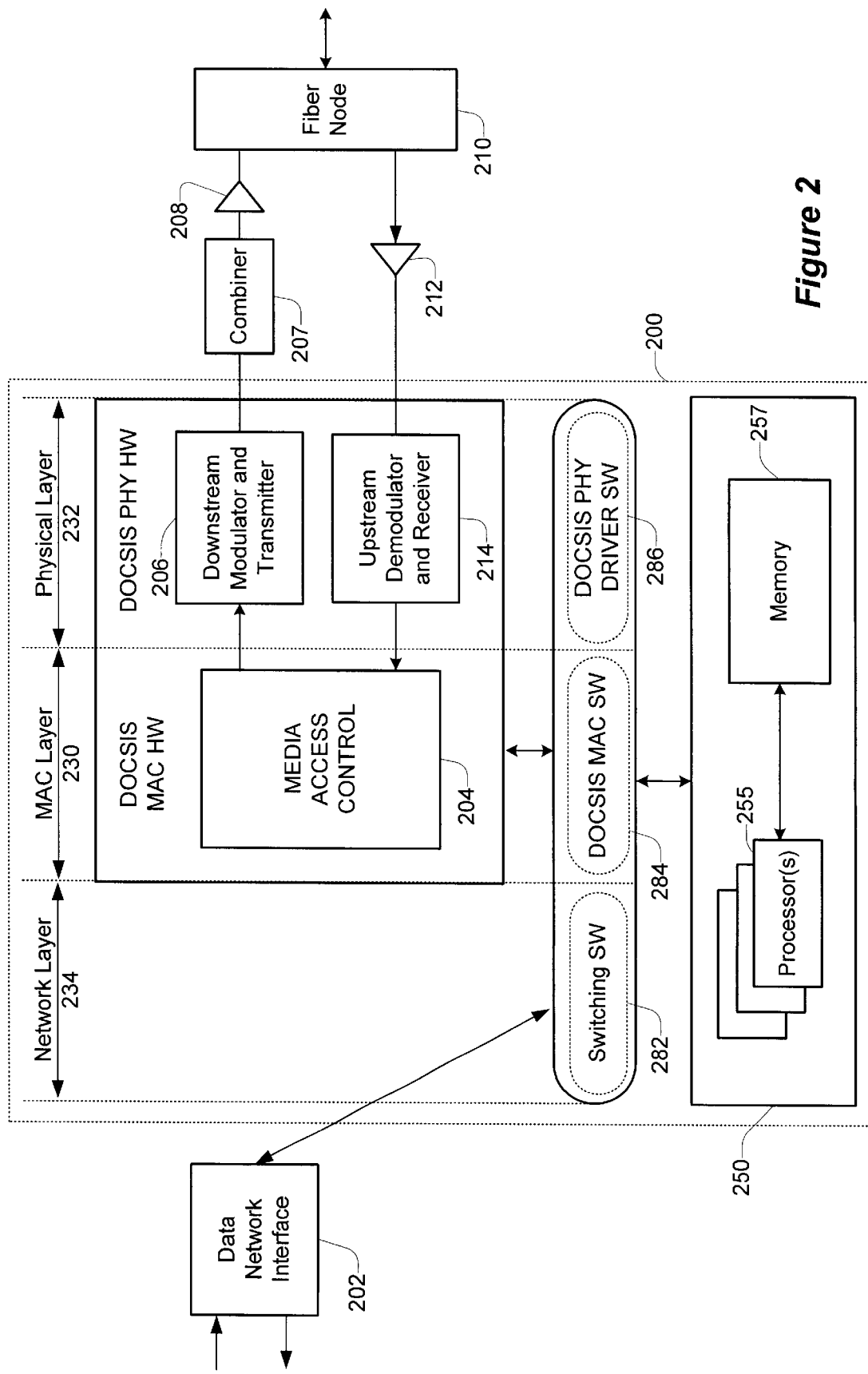
FIG. 2 is a diagrammatic representation illustrating the basic components of a Cable Modem Termination System (CMTS).

FIG. 2 is a diagrammatic representation illustrating the basic components of a Cable Modem Termination System (CMTS), represented by block 200. In a specific embodiment as shown, for example, in FIG. 2, the CMTS implements three network layers, including a physical layer 232, a Medial Access Control (MAC) layer 230, and a network layer 234. When a modem sends a packet of information (e.g. data packet, voice packet, etc.) to the CMTS, the packet is received at fiber node 210. Each fiber node 210 can generally service about 500 subscribers, depending on bandwidth. Converter 212 converts optical signals transmitted by fiber node 210 into electrical signals that can be processed by upstream demodulator and receiver 214.

The upstream demodulator and receiver 214 is part of the CMTS physical layer 232. Generally, the physical layer is responsible for receiving and transmitting RF signals on the HFC cable plant. Hardware portions of the physical layer include downstream modulator and transmitter 206 and upstream demodulator and receiver 214. The physical layer also includes device driver software 286 for driving the hardware components of the physical layer.

Once an information packet is demodulated by the demodulator/receiver 214, it is then passed to MAC layer 230. A primary purpose of MAC layer 230 is to coordinate channel access of multiple cable modems sharing the same cable channel. The MAC layer 230 is also responsible for encapsulating and de-encapsulating packets within a MAC header according to the DOCSIS standard for transmission of data or other information. This standard is currently a draft recommendation, which has been publicly presented to Study Group 9 of the ITU in October 1997, and is generally known to people in the cable modem data communication field.

MAC layer 230 includes a MAC hardware portion 204 and a MAC software portion 284, which function together to encapsulate information packets with the appropriate MAC address of the cable modem(s) on the system. Note that there are MAC addresses in the cable modems which encapsulates data or other information to be sent upstream with a header containing the MAC address of the hub associated with the particular cable modem sending the data.

Each cable modem on the system has its own MAC address. Whenever a new cable modem is installed, its address is registered with MAC layer 230. The MAC address is important for distinguishing data sent from individual cable modems to the CMTS. Since all modems on a particular channel share a common upstream path, the CMTS 204 uses the MAC address to identify and communicate with a particular modem on a selected upstream channel. Thus, data packets, regardless of format, are mapped to a particular MAC address.

MAC layer 230 is also responsible for sending out polling opportunities as part of the link protocol between the CMTS and each of the cable modems on a particular channel. As discussed above, these polling opportunities are important for maintaining communication between the CMTS and the cable modems (e.g., by providing opportunities for periodic ranging).

Figure 3:
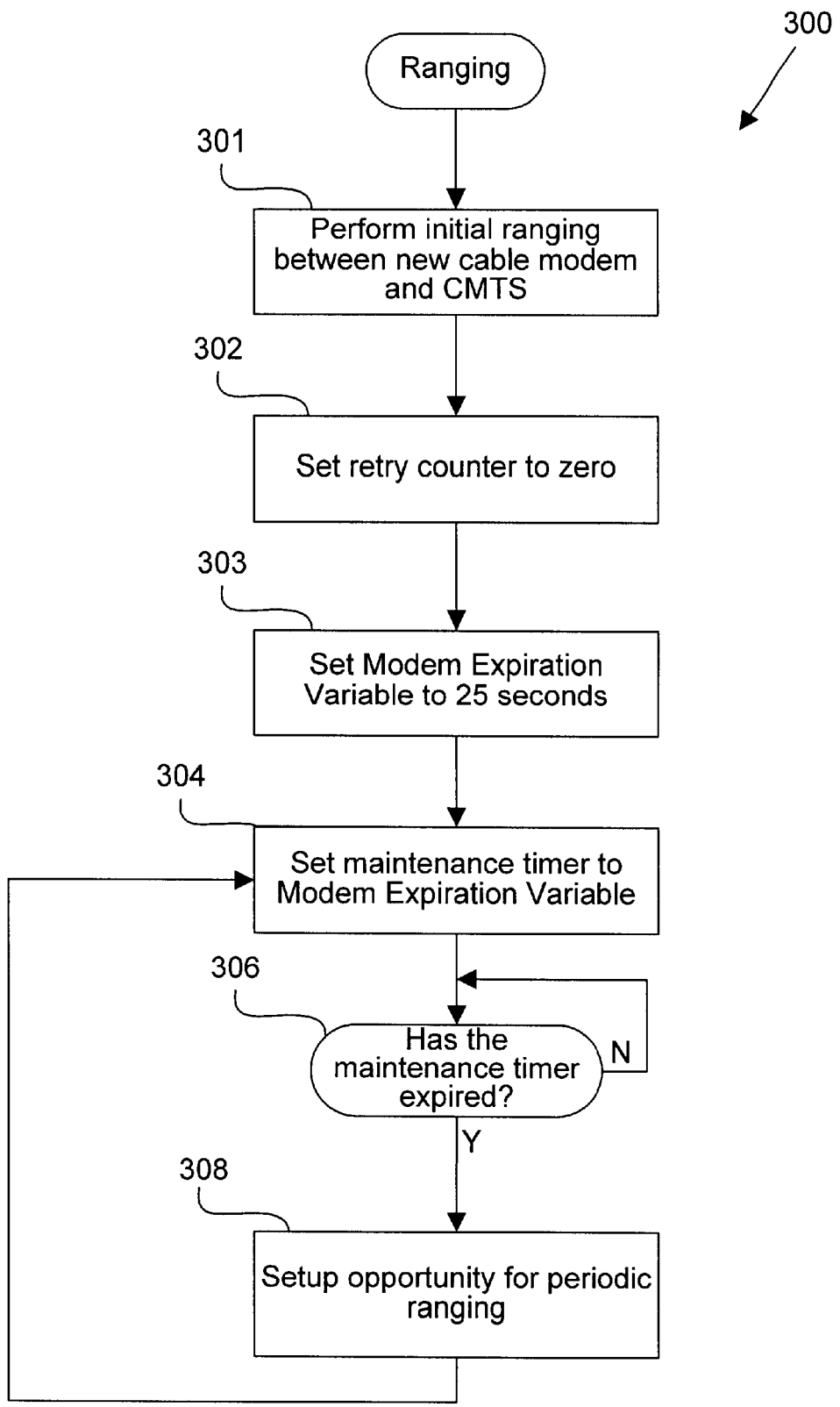
FIG. 3 is flowchart illustrating a process for performing a ranging procedure between a new cable modem and a CMTS in accordance with one embodiment of the present invention.

FIG. 3 is flowchart illustrating a process 300 for performing a ranging procedure between a new cable modem and a CMTS in accordance with one embodiment of the present invention. Initial ranging is performed between a cable modem and CMTS in operation 301. This initial ranging is generally performed to configure parameters of the cable modem such that acceptable communication is set up between the CMTS and the new cable modem. For example, the cable modem searches for a transmission power level that results in a recognizable response from the CMTS. The CMTS response informs the cable modem that the selected power level is acceptable or that the cable modem needs to adjust its power level by a particular value. Based on the CMTS response, the cable modem then may continue transmitting at the initial power level or adjust its power level. After an acceptable power level is reached, the initial ranging procedure ends.

After the initial ranging procedure, the cable modem and CMTS still need to perform periodic ranging to determine whether the cable modem continues to transmit within acceptable parameters. If the parameters are unacceptable, the cable modem adjusts its parameters during a periodic ranging procedure. For example, acceptable power levels may vary over time as seen by the head end. By way of specific examples, noise levels may change within the cable plant for one or more cable modems. Additionally, bandwidth allocations may be altered based on the data rate and size requirements of particular cable modems.

Prior to the CMTS sending an opportunity for periodic ranging to the cable modem, a few variables may be set up to track and implement the periodic ranging procedure. In the illustrated embodiment, a retry counter is set to zero in operation 302. The retry counter is used to track how many periodic ranging opportunities are attempted by the CMTS before a periodic ranging request is received from the cable modem and the modem is acceptably configured. After the retry counter is set to zero, a Modem Expiration Variable is set to 25 seconds in operation 303, and the maintenance timer is set to the Modem Expiration Variable in operation 304. Of course, the maintenance timer may be set before the retry counter is set. Additionally, the maintenance timer may be set to 25 seconds directly without using a Modem Expiration Variable. The maintenance timer indicates the duration of the interval between two successive opportunities for periodic ranging.

The maintenance timer may be set to any suitable initial value that minimizes the interval between initial polls while allowing at least one polling retry before the modem disconnects. In other words, the initial polling interval is set such that the initial polling interval plus the retry polling interval are less than the cable modem's disconnect interval. For example, the initial polling interval has a range that is between about 2 seconds shorter than the disconnect timer and about 20 seconds shorter than the disconnect timer, and the retry interval has a range between 0 and about 10 seconds. More preferably, the initial polling interval has a range that is between about 5 seconds shorter than the disconnect interval and about 10 seconds shorter than the disconnect interval, and the retry interval is between about 0.5 and 1 second.

In the illustrated embodiment, the initial value is 25 seconds, and the retry value is 1 second. If the cable modem always responds to the first poll, the CMTS only has to poll the cable modem every 25 seconds. Polling the cable modem every 25 seconds represents a significant savings in processing resources, as compared to polling every 10 seconds. Even if the cable modem does not respond within the first polling opportunity, the CMTS still has 5 seconds in which to continue polling (e.g., at 1 second intervals) the cable modem before disconnect occurs after 30 seconds.

After the maintenance timer is initially set to 25 seconds, the CMTS waits for the maintenance timer to expire in operation 306. After the maintenance timer expires, the CMTS sets up an opportunity for periodic ranging in operation 308. Generally, this set up procedure includes polling the cable modem, responding to a ranging request from the cable modem (if any) or polling the cable modem again, as well as setting the Modem Expiration Variable to a new or same value. After the Modem Expiration Variable is reset, the ranging process 300 continues to operation 304 and the maintenance timer is set to the Modem Expiration Variable.

Figure 4:
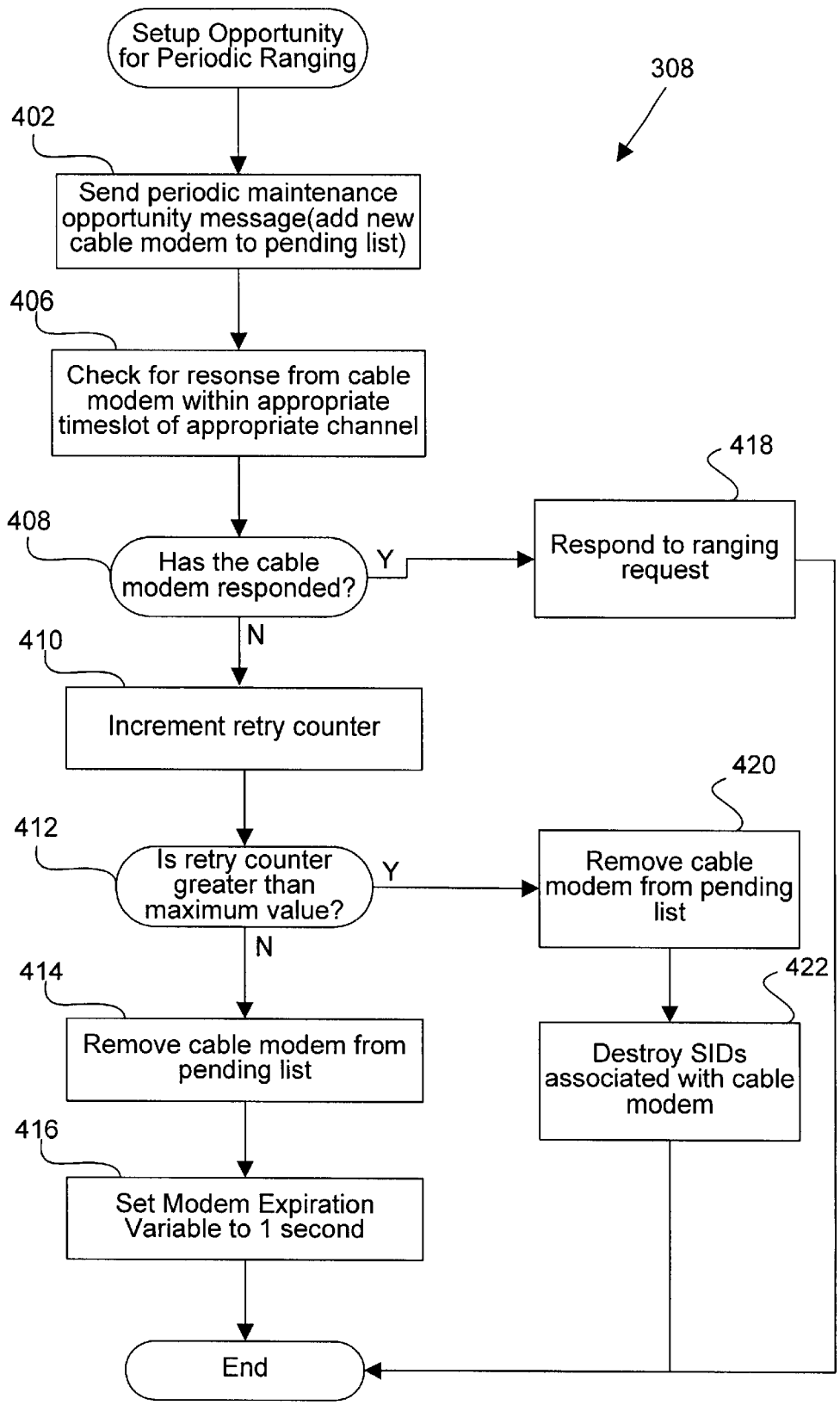
FIG. 4 is a flowchart illustrating the operation of FIG. 3 for setting up an opportunity for periodic ranging in accordance with one embodiment of the present invention.

FIG. 4 is a flowchart illustrating the operation 308 of FIG. 3 for setting up an opportunity for periodic ranging in accordance with one embodiment of the present invention. Initially, the CMTS sends a periodic maintenance opportunity to the new cable modem in operation 402. This opportunity may be generated in any suitable manner. For example, according to one embodiment, the new cable modem is added to a "pending" list that identifies which cable modems are to receive the periodic maintenance opportunity. When the new cable modem is referenced within the pending list, an allocation algorithm sends a MAP to the new cable modem. The allocation algorithm is responsible for assigning a specific time slot in a specific channel to each cable modem for sending a ranging request, which assignments are implied within the MAP that is sent to each cable modem. Thus, a periodic ranging opportunity is sent as part of the MAP.

After the periodic maintenance opportunity is sent to the new cable modem, the CMTS checks for a response from the new cable modem within the appropriate time slot of the appropriate channel in operation 406. For example, the CMTS looks for a ranging request from the cable modem within the assigned time slot of the assigned channel. It is then determined whether the cable modem has responded in operation 408.

A request for periodic ranging may not be received for several reasons. For example, the opportunity for periodic ranging from the CMTS may have been lost. Likewise, the request for periodic ranging may have also been lost. Opportunities or requests for periodic ranging may be lost because of too much noise within the cable plant, for example. Additionally, the cable modem may have disconnected or is not sending periodic ranging requests.

If the cable modem has responded, the CMTS responds to the ranging request from the cable modem in operation 418, and the process 308 for setting up an opportunity ends. Operation 418 is described further in reference to FIG. 6. If the cable modem has not responded, the retry counter is incremented in operation 410. It is then determined whether the retry counter is greater then a maximum value in operation 412. This operation may be implemented for cases where the cable modem is taking an inordinate amount of time to range. That is, the cable modem continues to have unacceptable configuration parameters even after several periodic ranging attempts by the CMTS to adjust the modem's parameters. After a predetermined number of ranging tries, it may be assumed that the modem cannot be acceptably configured.

The maximum value may be any suitable value for indicating how many ranging retries are allowed before the cable modem is disconnected. For example, in one embodiment the maximum value is set to a value of 16, which is implied by the DOCSIS standard.

If the retry counter is greater than the maximum value, the cable modem is removed from the pending list in operation 420. In other words, the cable modem is not polled, and as a result, the cable modem disconnects after 30 seconds. The SIDs associated with the cable modem are then destroyed in operation 422, thereby severing communication with the cable modem.

When the cable modem disconnects, the ranging process for that modem terminates. For example, the ranging process 300 is discontinued or disabled for the disconnected modem. The ranging process is then reinitiated when the cable modem attempts to reestablish communication. For example, the ranging process 300 restarts at operation 301, and initial ranging is performed for the reconnected modem.

If the retry counter is not greater than the maximum value, the cable modem is also removed from the pending list in operation 414. The modem expiration variable is then set to 1 second in operation 416, and the process 308 for setting up an opportunity ends. After the modem expiration variable is set to 1 second (or reset to 25 seconds within the procedure 418 for responding to the cable modem's ranging request), the ranging process proceeds to operation 304 of FIG. 3 and the maintenance timer is then set to the modem expiration variable (25 seconds or 1 second). The CMTS again waits for the maintenance timer After 1 second (or 25 seconds), another opportunity for periodic ranging is set up in operation 308 of FIG. 3.

The cable modem includes any suitable mechanism for making a periodic ranging request in response to the CMTS's opportunity for periodic ranging. For example, the cable modem simply disconnects if periodic ranging is not desired. More typically, the modem requests periodic ranging.

Figure 5:
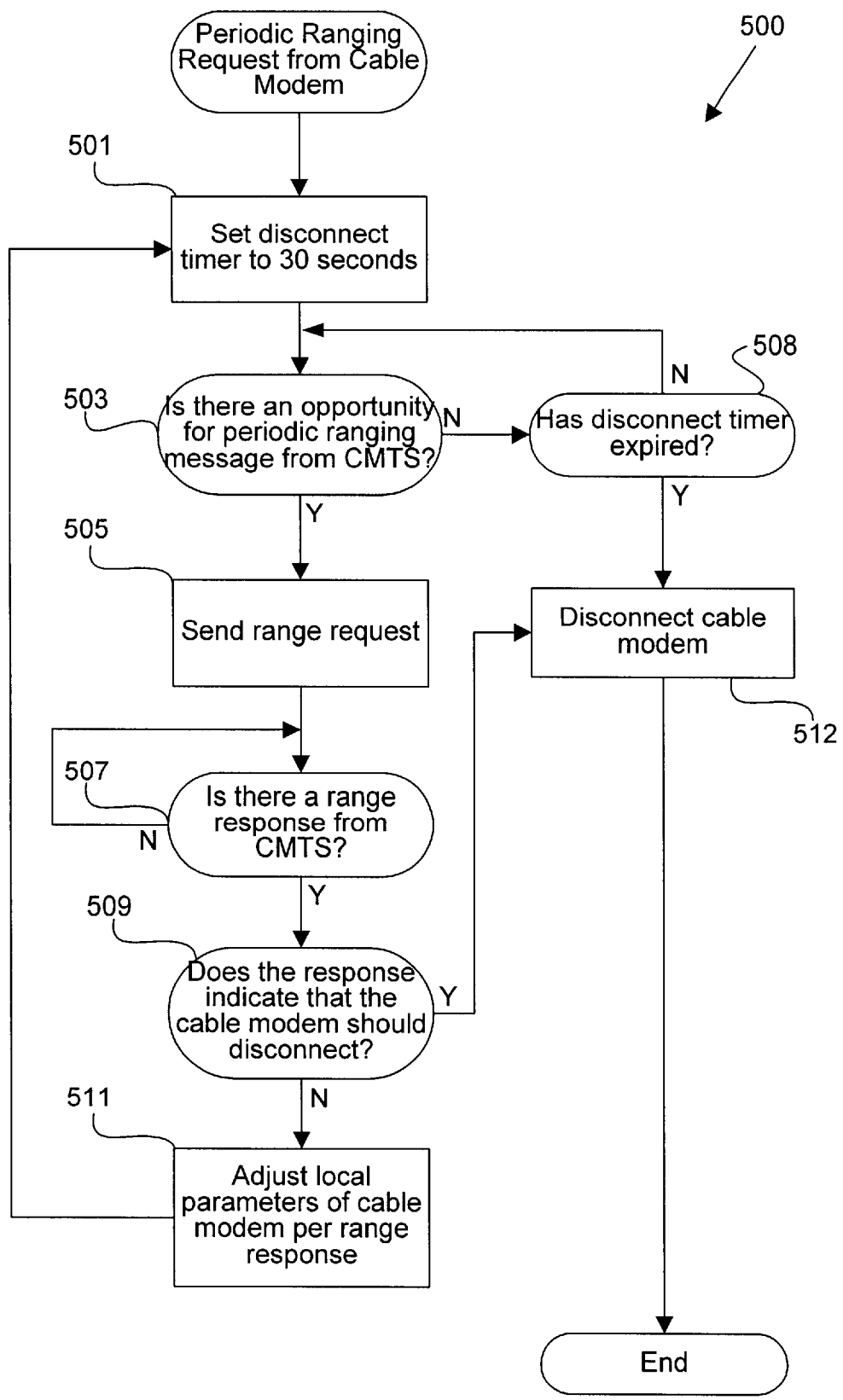
FIG. 5 is a flowchart illustrating process of a periodic ranging request from the cable modem in accordance with one embodiment of the present invention.

FIG. 5 is a flowchart illustrating process 500 of a periodic ranging request from the cable modem in accordance with one embodiment of the present invention. Initially, a disconnect timer is set to 30 seconds in operation 501. The DOCSIS specification mandates a 30 second disconnect time interval.

Of course, other values may be chosen for the disconnect timer. For other disconnect timer values, the initial maintenance timer value may be correspondingly changed. That is, the maintenance timer may be set to minimize the load on the CMTS for sending opportunities, while leaving enough time for retries. For example, if the cable modem's disconnect timer is set to 50 seconds, the maintenance timer of the CMTS may be correspondingly set to 45 seconds.

After the disconnect timer is set, it is then determined whether there is an opportunity for periodic ranging from the CMTS in operation 503. If there is no opportunity from the CMTS, it is then determined whether the disconnect timer has expired in operation 508. If the disconnect timer has expired, the cable modem is disconnected in operation 512 and the process 500 for periodic ranging requests ends. If the disconnect timer has not expired, it is once again determined whether an opportunity for periodic ranging has been received from the CMTS in operation 503.

After an opportunity is received from the CMTS, a range request is sent by the cable modem to the CMTS in operation 505. The cable modem waits for a range response to the request from the CMTS in operation 507. However, if the disconnect timer of the cable modem expires, the cable modem times out and disconnects. A mechanism for responding to the request is described below in reference to FIG. 6.

After there is a range response from the CMTS, it then determined whether the response indicates that the cable modem should disconnect in operation 509. If the response indicates that the cable modem should disconnect, the cable modem disconnects in operation 512 and the process 500 ends.

As discussed above, when the cable modem disconnects, the ranging processing ceases. In the illustrated embodiment, the ranging process 300 of FIG. 3 ends for the disconnected modem. The ranging process 300 is restarted when the cable modem reconnects.

Returning to FIG. 5, if the response from the CMTS does not indicate that the cable modem should disconnect, the local parameters of the cable modem are adjusted based on the range response from the CMTS in operation 511. In other words, the range response includes adjustment values for the parameters of the cable modem. These parameters may include any suitable configuration parameters for the cable modem. For example, the parameters may include an amplification value for the transmission signal or new time slots and/or channel values. After the local parameters are adjusted, the disconnect timer is then reset to 30 seconds in operation 501. Of course, the CMTS may indicate that no adjustment is necessary, and operation 505 is thereby skipped.

Figure 6:
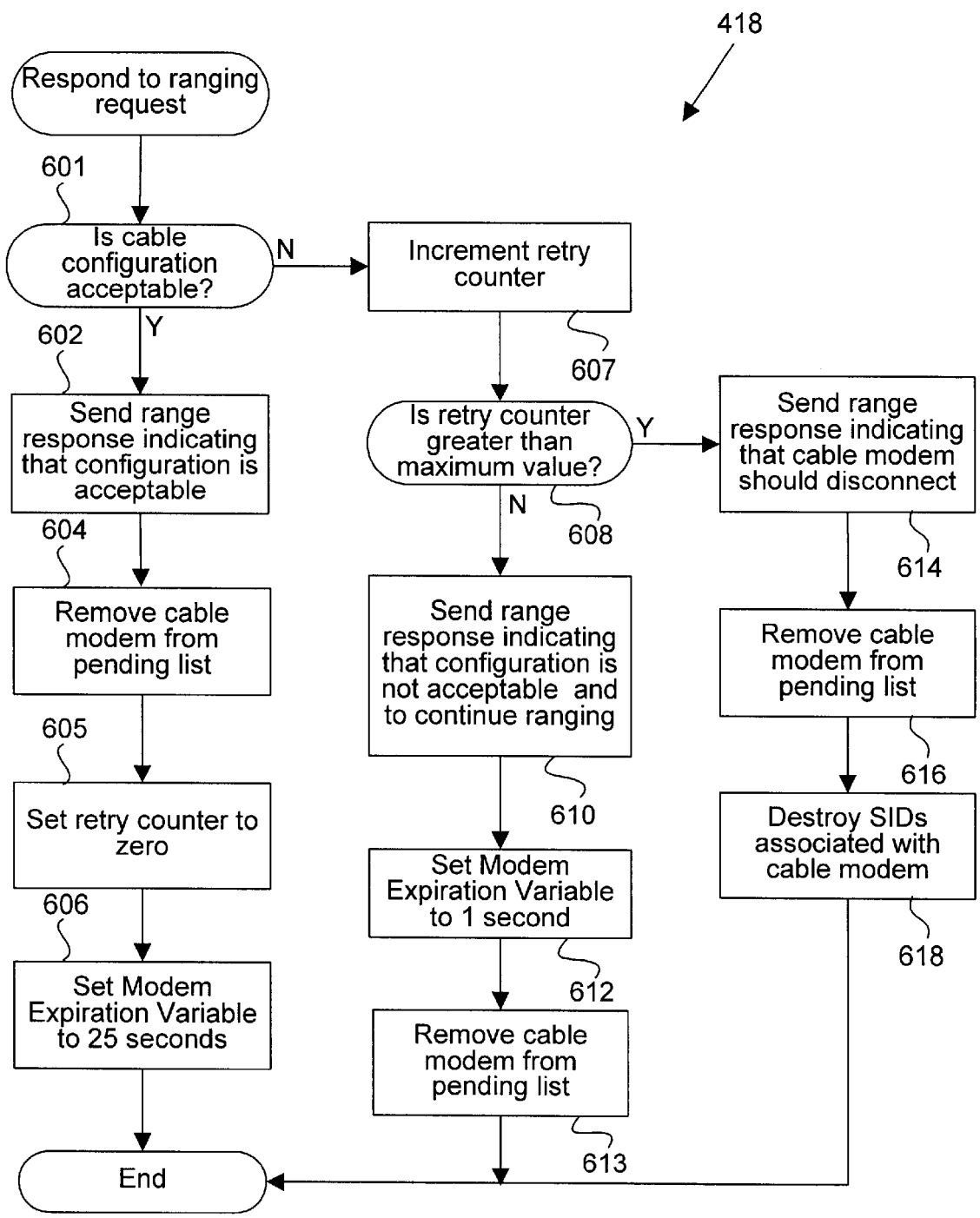
FIG. 6 is a flowchart illustrating the CMTS response to a ranging request from the cable modem in accordance with one embodiment of the present invention.

FIG. 6 is a flowchart illustrating the CMTS response to a ranging request from the cable modem (i.e., operation 418 of FIG. 4) in accordance with one embodiment of the present invention. Initially, it is determined whether the cable modem configuration is acceptable in operation 601. For example, it is determined whether the power level of signals received from the cable modem are within an acceptable voltage level range. If the cable modem is configured in an acceptable manner, a range response is sent by the CMTS to indicate that the configuration is acceptable in operation 602. The cable modem is then removed from the pending list in operation 604. The retry counter is reset to zero in operation 605, and the Modem Expiration Variable is reset to 25 seconds in operation 606. The response to the ranging request 418 then ends and control is passed to operation 304 of FIG. 3, where the maintenance timer is set to the Modem Expiration Variable.

If the modem configuration is not acceptable, the retry counter is incremented in operation 607. It is then determined whether the retry counter is greater then the maximum value in operation 608. In other words, it is determined whether an unacceptable number of periodic ranging attempts to adjust the modem configuration have occurred. If the retry counter is not greater then the maximum value, in operation 610 a range response is sent by the CMTS indicating that modem's configuration is not acceptable and to continue ranging. The Modem Expiration Variable is then set to one second in operation 612. The cable modem is then removed from the pending list in operation 613. The response to the ranging request then ends, and maintenance timer is set to the Modem Expiration Variable in operation 304 of FIG. 3.

If the retry counter is greater then the maximum value, a range response is sent by the CMTS indicating that the cable modem should disconnect in operation 614. The cable modem is then removed from the pending list in operation 616. SIDs that are associated with the cable modem are then destroyed in operation 618 and the response to the ranging request ends. The cable modem is then allowed to time out and disconnect.

After the response to the ranging request ends, control is passed to operation 304 of FIG. 3, were the maintenance timer is set to the modem expiration variable (25 seconds or 1 seconds). However, if the cable modem has been disconnected (e.g., by having its SIDs destroyed in operation 618 of FIG. 6), the ranging process 300 is terminated for that cable modem. The ranging process restarts when the cable modem is reconnected.

In the previously described embodiments, two maintenance timer values are used (e.g., an initial interval of 25 seconds and a retry interval of 1 second). The initial value is used to attempt a first polling of the cable modem. If the modem responds to this first poll, the maintenance timer is reset to the first value. If the modem fails to respond, the second timer value is used to attempt a retry of the polling at a more frequent interval.

Although using a single initial interval value and a single retry interval value works well in most environments, either of these two values may be intelligently adjusted under certain conditions. For example, within a particular noisy environment, the two polling intervals may not leave enough time for the CMTS's polling opportunity to reach the cable modem (and visa versa) before the cable modem disconnects. That is, in particularly noisy environments, it is more likely that the polling opportunities (e.g., both the 25 second initial poll and subsequent 1 second retry polls) are lost and do not reach the cable modem before the cable modem disconnects (e.g., after 30 seconds).

The mechanisms for polling a cable modem may be improved by intelligently adjusting the maintenance timer values if these values prove unsuccessful in invoking a periodic range request from a cable modem. For example, if a retry maintenance value of 1 second fails to invoke a request from the cable modem, a shorter timer interval may be used for the subsequent retry maintenance timer value. For example, the timer may be set to 0.9 second. If this second retry maintenance value fails to invoke a response from the cable modem, it may be set to an even lower value, e.g., 0.5 second. Alternatively, the initial maintenance timer value may be adjusted.

Figure 7:
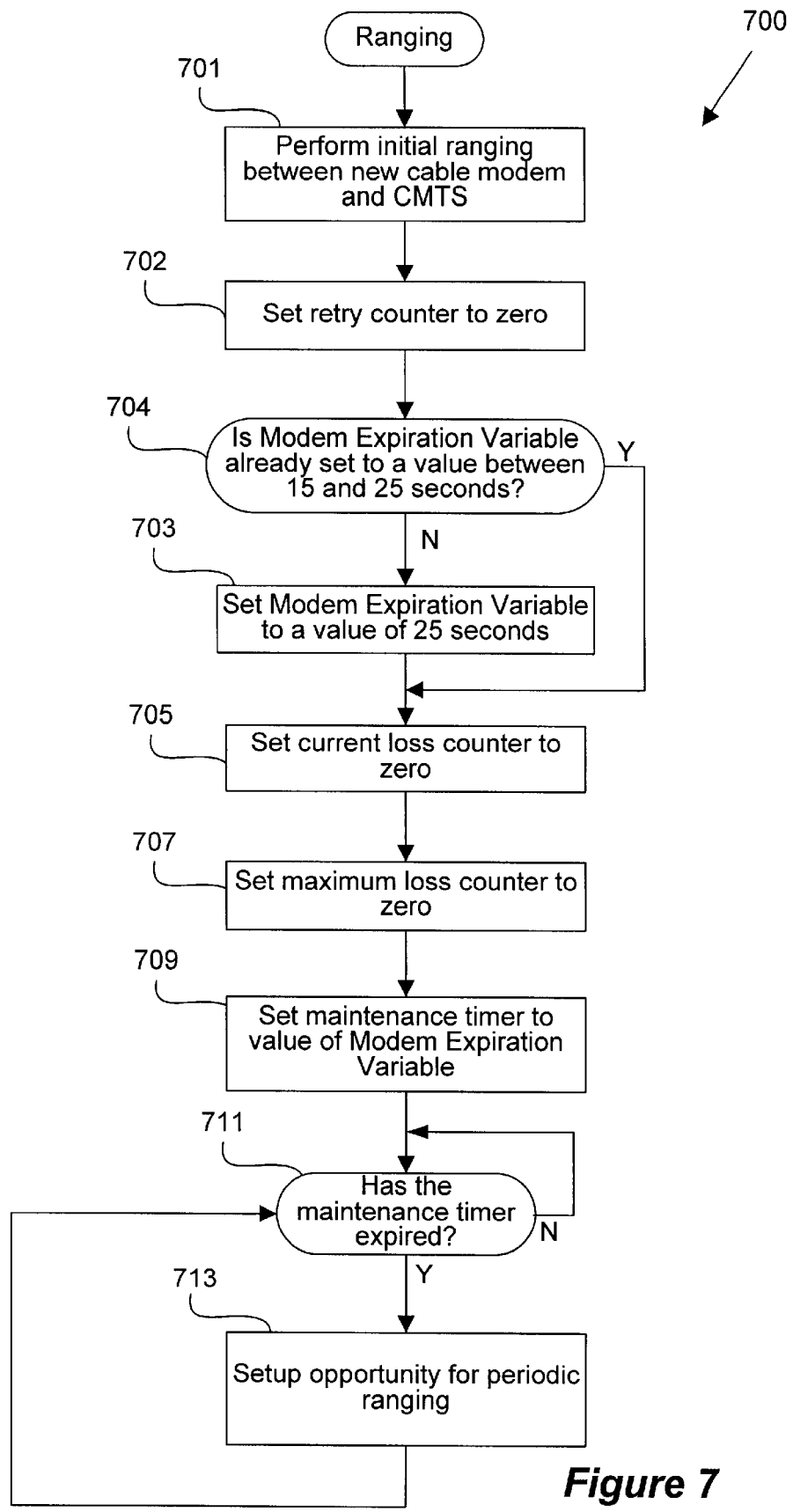
FIG. 7 is a flowchart illustrating a ranging process for intelligently adjusting the initial polling interval in accordance with an alternative embodiment of the present invention.

FIG. 7 is a flowchart illustrating a ranging process 700 for intelligently adjusting the initial polling interval in accordance with an alternative embodiment of the present invention. An initial ranging process is performed between the new cable modem and CMTS in operation 701. This initial ranging process may be implemented as described above for operation 301 of FIG. 3.

Several variables are then set up for tracking various events within the ranging process. A retry counter is generally used to track how many opportunities are sent to the modem before the modem is acceptably configured. A current loss counter is generally used to track the number of times that an opportunity is sent to the modem without invoking a response. A maximum loss counter is generally used to store the loss counter value before the loss counter is reset. A modem expiration variable is used to store the initial polling value. The maximum loss counter and modem expiration variable may then be analyzed to determine whether to adjust the initial polling interval (e.g., when the time in which the modem is not responding is approaching 30 seconds).

The current loss counter is set to zero in operation 702. It is determined whether the Modem Expiration Variable is already set to a value that is between 15 and 25 seconds in operation 704. In other words, the Modem Expiration Variable value may have already been reduced from 25 seconds to 24 seconds, for example when another cable modem timed out. If the Modem Expiration Variable is already set to a value between 15 and 25, the modem expiration variable is set to a value of 25 seconds in operation 703. If the Modem Expiration Variable is not already set to a value between 15 and 25, operation 703 is skipped.

The current loss counter and maximum loss counter are then set to zero in operations 705 and 707, respectively. The maintenance timer is then set to the value of the modem expiration variable in operation 709. The CMTS then waits for the maintenance timer to expire in operation 711. After expiration, an opportunity for periodic ranging is set up by the CMTS in operation 713. Setting up an opportunity includes setting a new or same value for the maintenance timer. Thus, after the opportunity for periodic ranging is set up, the CMTS waits for the maintenance timer to expire in operation 711, and another opportunity for periodic ranging is set up again in operation 713.

Figure 8:
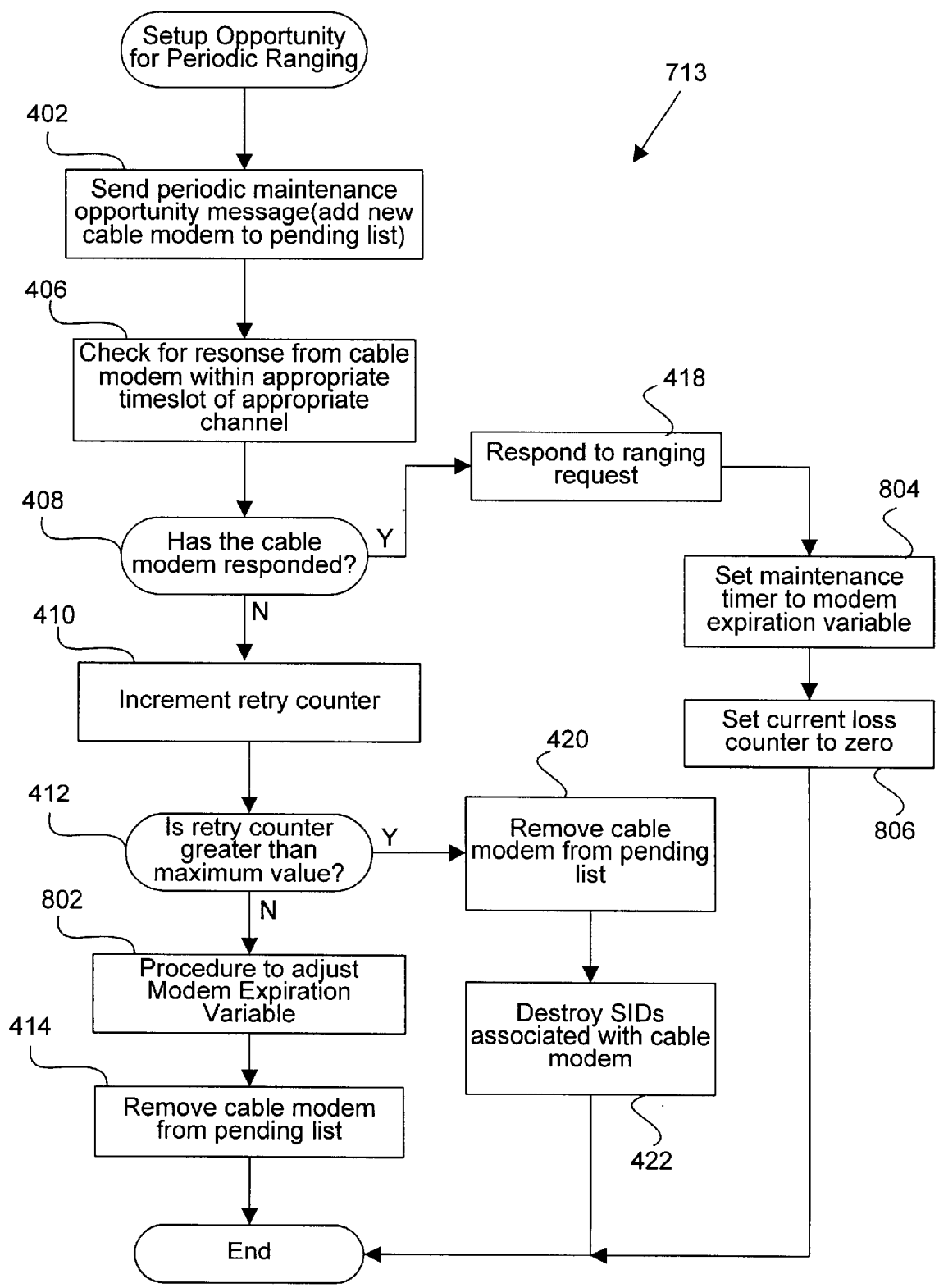
FIG. 8 is a flowchart illustrating the operation of FIG. 7 for setting up an opportunity for periodic ranging in accordance with one embodiment of the present invention.

FIG. 8 is a flowchart illustrating the operation 713 of FIG. 7 for setting up an opportunity for periodic ranging in accordance with one embodiment of the present invention. Several operations are similar to those described for FIG. 4. That is, the opportunity is sent in operation 402, and it is determined whether the cable modem has responded in operations 406 and 408. If a request is received from the modem, the CMTS responds to the periodic ranging request in operation 418. The maintenance timer is then set to the modem expiration variable (e.g., 25 seconds) in operation 804. The current loss counter is then reset to zero in operation 806, and the setup of the opportunity for periodic ranging ends.

If the cable modem has not responded in operation 408, the retry counter is then incremented in operation 410. It is then determined whether the retry counter is greater than the maximum value (e.g., 16) in operation 412. If too many retries have occurred (e.g., more than the maximum value), the cable modem is removed from the pending list and allowed to disconnect in operation 420 and 422. If too many retries have not occurred, a procedure for adjusting the modem expiration variable (or initial polling interval) is performed in operation 802. The cable modem is then removed from the pending list in operation 414, and the opportunity setup process 713 ends.

This adjustment procedure generally includes determining whether to adjust the initial polling interval, and then adjusting (or not adjusting the interval) accordingly. In the illustrated embodiment, if the cable modem is not responding within a time interval that is approaching the modem's disconnect time (e.g., 30 seconds), the initial polling interval is then decreased so that the CMTS has a longer interval in which to poll the cable modem (and other cable modems on the same upstream channel) before the modem disconnects. Either the initial polling interval or the retry interval may be adjusted after the total loss time (e.g., a count of the consecutive periodic ranging opportunities being sent at the retry interval that fail to result in a periodic ranging request times the retry interval plus the initial interval) is within a margin of the cable modem's disconnect time. The margin may be any suitable value. For example, the margin may have a range between about 3 seconds shorter than the disconnect time and greater than the disconnect time. In the illustrated embodiment, the initial or retry polling interval is adjusted when the total loss time is 30 seconds or more.

The initial polling interval may be adjusted in any suitable manner each time the modem fails to respond within 30 seconds. For example, the cable modem may be polled after an initial interval of 24 seconds, instead of 25 seconds. If the retry interval is then set to 1 second, the CMTS may then send an extra retry poll before the cable modem disconnects. The initial polling interval value may be decreased by a constant value each time the modem fails to responds within 30 seconds. In the illustrated embodiment, the initial value is decreased by 1 second each time the modem fails to respond within 30 seconds. Alternatively, the initial value may be decreased by a different amount each time. For example, the first time that the modem fails to respond within 30 seconds, the initial value is decreased by 0.5 seconds, the second time it is decreased by 1 second, the third time it is decreased by 2 seconds, etc. In other words, any suitable algorithm may be used to adjust the initial polling interval value.

The initial polling interval may be adjusted in any suitable manner. For example, the maintenance timer for a particular modem may also be adjusted after the modem disconnects and then reconnects. For example, a disconnect flag may be set when a particular modem disconnects to indicate that it's corresponding initial maintenance timer value (or retry value) should be decreased. Alternatively, the initial polling interval may be adjusted after a particular number of opportunities have failed to invoke a response from the modem.

Figure 9:
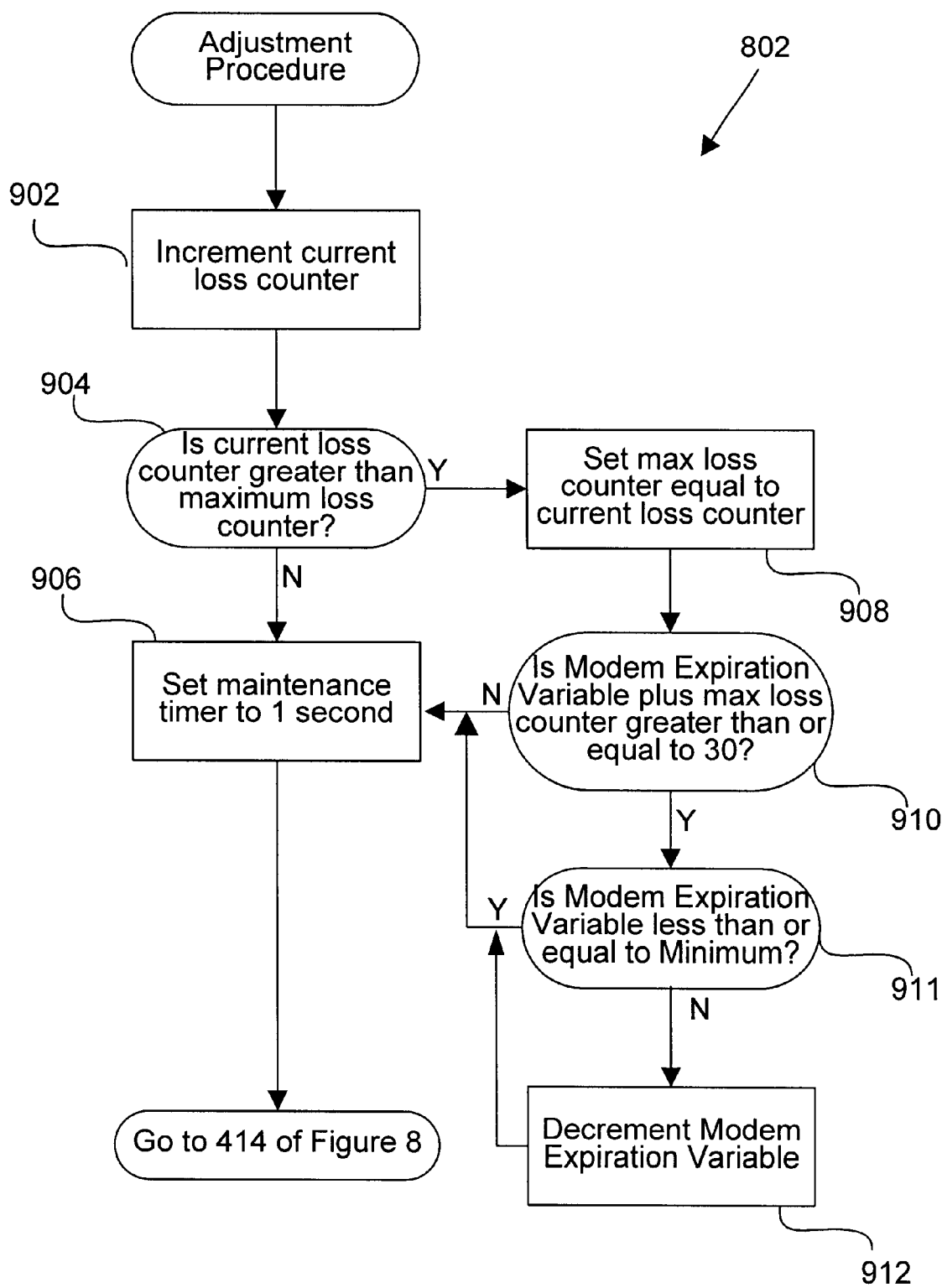
FIG. 9 is a flowchart illustrating the adjustment procedure of FIG. 8 that is performed after the cable modem fails to respond to a ranging opportunity in accordance with one embodiment of the present invention.

FIG. 9 is a flowchart illustrating the adjustment procedure 802 of FIG. 8 that is performed after the cable modem fails to respond to a ranging opportunity in accordance with one embodiment of the present invention. Generally, the maximum loss counter, current loss counter, and modem expiration variable are analyzed to determine whether to adjust the initial polling interval (e.g., the modem expiration variable is decremented).

Initially, the current loss counter is incremented in operation 902. It is then determined whether the current loss counter is greater is then maximum loss counter in operation 904. If the current loss counter is not greater, the maintenance timer is then set to 1 second in operation 906. The adjustment procedure 802 then ends, and control is passed to operation 414 of FIG. 8, where the cable modem is removed from the pending list. The CMTS then waits for the maintenance timer to expire in operation 711 of FIG. 7.

Turning back to FIG. 9, if it is determined that the current loss counter is greater then the maximum loss counter in operation 904, the maximum loss counter is then set to the current loss counter value in operation 908. It is then determined whether the modem expiration variable value plus the maximum loss counter value are greater than or equal to 30 (or the disconnect time interval after which the modem disconnects).

Turning back to FIG. 9, if it is determined that the current loss counter is greater then the maximum loss counter in operation 904, the maximum loss counter is then set to the current loss counter value in operation 908. It is then determined whether the modem expiration variable value plus the maximum loss counter value are greater than or equal to 30 (or the disconnect time interval after which the modem disconnects) in operation 910.

If the modem expiration variable value plus the maximum loss counter value are greater than or equal to 30 and the modem expiration variable is not below or equal to the minimum, the modem expiration variable is decremented in operation 912. The maintenance timer is then set to 1 second in operation 906. The adjustment process 802 then continues at operation 414 of FIG. 8, where the modem is removed from the pending list. The maintenance timer then expires after 1 second, and another opportunity is set up in operation 713 of FIG. 7. If the modem then responds, the maintenance timer is eventually set to the new modem expiration variable value of 24 seconds, for example, in operation 804 of FIG. 8 after responding to the modem's ranging request in operation 418 of FIG. 8.

Referring to FIG. 9, if the modem expiration variable value plus the maximum loss counter value are not greater than or equal to 30 or the modem expiration variable is equal to or less than the minimum, the modem expiration variable is not decremented. The maintenance timer is then set to 1 second in operation 906. The adjustment process 802 then continues at operation 414 of FIG. 8, where the modem is removed from the pending list.

After ranging is performed, the CMTS may then process data requests from the cable modem. Turning back to FIG. 2, after upstream information (e.g., data requests from the cable modem) has been processed by MAC layer 230, it is then passed to network layer 234. Network layer 234 includes switching software 282 for causing the upstream information packet to be switched to an appropriate data network interface on data network interface 202.

When a packet is received at the data network interface 202 from an external source, the switching software within network layer 234 passes the packet to MAC layer 230. MAC block 204 transmits information via a one-way communication medium to a downstream modulator and transmitter 206. Downstream modulator and transmitter 206 takes the data (or other information) in a packet structure and modulates it on the downstream carrier using, for example, QAM 64 modulation (other methods of modulation can be used such as CDMA {Code Division Multiple Access} OFDM {Orthogonal Frequency Division Multiplexing}, FSK {FREQ Shift Keying}). The return data is likewise modulated using, for example, QAM 16 or QSPK. These modulations methods are well-known in the art.

Downstream Modulator and Transmitter 206 converts the digital packets to modulated downstream RF frames, such as, for example, MPEG or ATM frames. Data from other services (e.g. television) is added at a combiner 207. Converter 208 converts the modulated RF electrical signals to optical signals that can be received and transmitted by a Fiber Node 210 to the cable modem hub.

It is to be noted that alternate embodiments of the CMTS (not shown) may not include network layer 234. In such embodiments, a CMTS device may include only a physical layer and a MAC layer, which are responsible for modifying a packet according to the appropriate standard for transmission of information over a cable modem network. The network layer 234 of these alternate embodiments of CMTS devices may be included, for example, as part of a conventional router for a packet-switched network.

Figure 1:
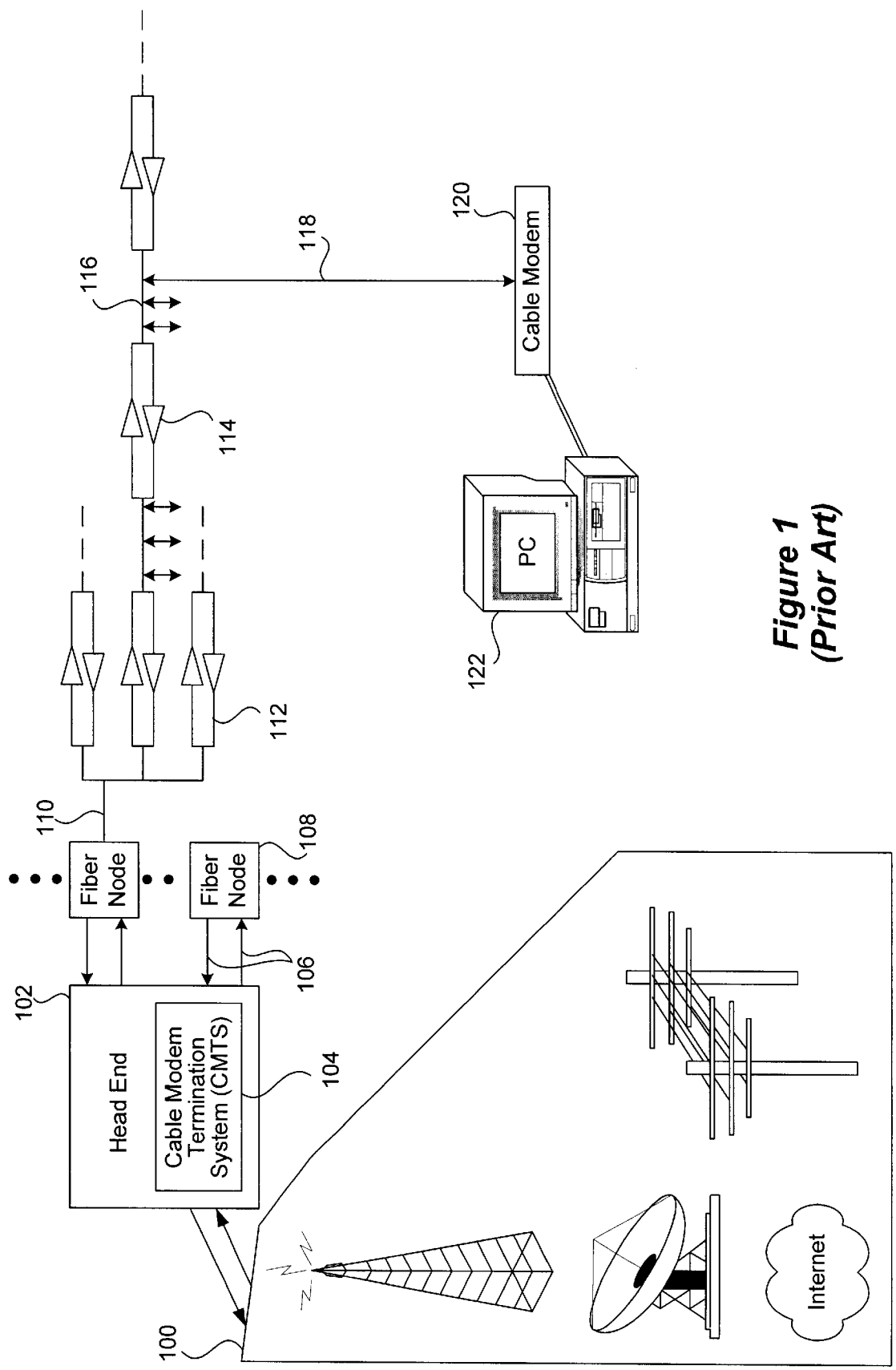
FIG. 1 is a block diagram of a two-way hybrid fiber-coaxial (HFC) cable system utilizing a cable modem for data transmission.

In a specific embodiment, the network layer of the CMTS is configured as a cable line card coupled to a standard router that includes the physical layer 232 and MAC layer 230. Using this type of configuration, the CMTS is able to send and/or receive IP packets to and from the data network interface 202 using switching software block 282. The data network interface 202 is an interface component between external data sources and the cable system. The external data sources (item 100 of FIG. 1) transmit data to the data network interface 202 via, for example, optical fiber, microwave link, satellite link, or through various media. The data network interface includes hardware and software for interfacing to various networks such as, for example, Ethernet, ATM, frame relay, etc.

As shown in FIG. 2, CMTS 204 also includes a hardware block 250 which interacts with the software and other hardware portions of the various layers within the CMTS. Block 250 includes one or more processors 255 and memory 257. The memory 257 may include, for example, I/O memory (e.g. buffers), program memory, shared memory, etc. Hardware block 250 may physically reside with the other CMTS components, or may reside in a machine or other system external to the CMTS. For example, the hardware block 250 may be configured as part of a router which includes a cable line card.

Generally, the periodic ranging techniques of the present invention may be implemented in software and/or hardware. For example, it can be implemented in an operating system kernel, in a separate user process, in a library package bound into network applications, on a specially constructed machine, or on a network interface card. In a specific embodiment of this invention, the techniques of the present invention are implemented in software such as an operating system or in an application running on an operating system.

A software or software/hardware hybrid ranging system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the ranging systems of this invention may be specially configured routers (such as, for example, specially configured router models 1600, 2500, 2600, 3600, 4500, 4700, 7200, 7500, and 12000, available from Cisco Systems, Inc. of San Jose, Calif.) which have been adapted to interface with cable networks. A general architecture for some of these machines will appear from the description given below. In an alternative embodiment, the ranging system may be implemented on a general-purpose network host machine such as a personal computer or workstation adapted to interface with computer networks. Further, as described previously, the invention may be at least partially implemented on a card (e.g., a cable line card) for a network device or a general-purpose computing device.

Figure 10:
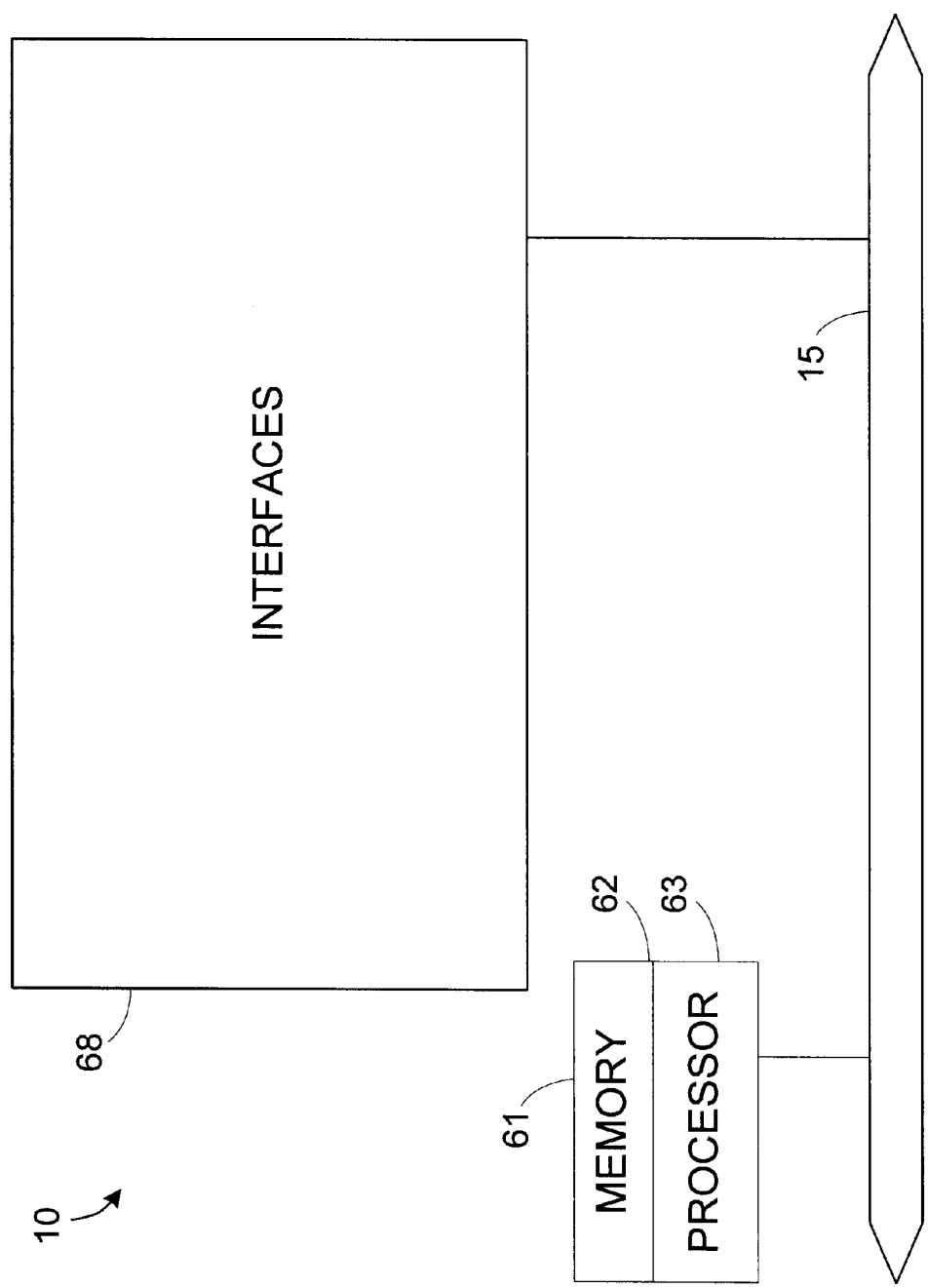
FIG. 10 is a diagrammatic representation of a router.

Referring now to FIG. 10, a router 10 suitable for implementing the present invention includes a master central processing unit (CPU) 62, interfaces 68, and a bus 15 (e.g., a PCI bus). When acting under the control of appropriate software or firmware, the CPU 62 is responsible for such router tasks as routing table computations and network management. It may also be responsible for periodically polling the cable modem for periodic ranging requests, determining when to initially poll, determining when to retry a poll, adjusting the initial and/or retry polling intervals, etc. It preferably accomplishes all these functions under the control of software including an operating system (e.g., the Internetwork Operating System (IOS®) of Cisco Systems, Inc.) and any appropriate applications software. CPU 62 may include one or more processors 63 such as a processor from the Motorola family of microprocessors or the MIPS family of microprocessors. In an alternative embodiment, processor 63 is specially designed hardware for controlling the operations of router 10. In a specific embodiment, a memory 61 (such as non-volatile RAM and/or ROM) also forms part of CPU 62. However, there are many different ways in which memory could be coupled to the system.

The interfaces 68 are typically provided as interface cards (sometimes referred to as "line cards"). Generally, they control the sending and receiving of data packets over the network and sometimes support other peripherals used with the router 10. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 10 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (including memory 61) configured to store program instructions for the general-purpose network operations and mechanisms for sending opportunities for periodic ranging described herein. The program instructions may control the operation of an operating system and/or one or more applications, for example. The memory or memories may also be configured to store the retry counter, the maximum value for the retry counter, the maximum retry counter, the modem expiration variable, the disconnect flag, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. For example, although mechanisms have been described for intelligently decreasing the initial or retry polling interval, of course, both intervals may be decreased. Additionally, either intervals may be increased when applicable, e.g., within a particular noise free environment. Accordingly, the present embodiments are to be considered as illustrative and not restrictive, and the invention is not to be limited to the details given herein, but may be modified within the scope and equivalents of the appended claims.

What is claimed is:

1. A cable modem termination system (CMTS), the CMTS capable of outputting periodic ranging opportunities, the CMTS comprising:

an upstream receiver and demodulator capable of receiving an upstream signal;

a downstream transmitter and modulator capable of transmitting a downstream signal; and a processor arranged to output a first periodic ranging opportunity after a first polling interval from the downstream transmitter and to output a second periodic ranging opportunity after a second polling interval if the upstream receiver and demodulator has not received a periodic ranging request in response to the first periodic ranging opportunity, wherein the second polling interval is shorter than the first polling interval.

2. A CMTS as recited in claim 1, wherein the first polling interval plus the second polling interval are less than a disconnect interval after which a cable modem that is communicating with the upstream receiver disconnects.

3. A CMTS as recited in claim 2, wherein the first polling interval has a range between about 2 seconds shorter than a disconnect interval after which the cable modem disconnects and about 20 seconds shorter than the disconnect interval, and the second polling interval is greater than 0 and less than or equal to about 10 seconds.

4. A CMTS as recited in claim 3, wherein the first polling interval has a range between about 5 seconds shorter than a disconnect interval after which the cable modem disconnects and about 10 seconds shorter than the disconnect interval, and the second polling interval is greater than 0.5 second and less than or equal to about 1 second.

5. A CMTS as recited in claim 1, further comprising a maintenance timer, wherein the first periodic ranging opportunity is output after setting the maintenance timer to the first polling interval and after the maintenance timer expires.

6. A CMTS as recited in claim 5, wherein the second periodic ranging opportunity is output after setting the maintenance timer to the second polling interval and after the maintenance timer expires.

7. A CMTS as recited in claim 1, wherein the processor is further arranged to output a next periodic ranging opportunity after the first polling interval when a response is received by the upstream receiver to the first periodic ranging opportunity.

8. A CMTS as recited in claim 1, wherein the processor is further arranged to output a next periodic ranging opportunity after the second polling interval when a response to the second periodic ranging opportunity is not received by the upstream receiver.

9. A CMTS as recited in claim 1, wherein the process is further arranged to:
   output a next periodic ranging opportunity after the second polling interval if the receiver has not consecutively received a response to the first or second periodic ranging opportunity more than a predetermined maximum number of times; and
   discontinue the outputting of any periodic ranging opportunity.

10. A CMTS as recited in claim 2, wherein the first polling interval is selected to minimize a rate at which the periodic ranging opportunities are output at the first polling interval.

11. A cable modem termination system (CMTS), the CMTS capable of sending opportunities for periodic ranging, the CMTS comprising:
   an upstream receiver and demodulator capable of receiving an upstream signal;
   a downstream transmitter and modulator capable of transmitting a downstream signal; and
   a processor arranged to:
      output a plurality of periodic ranging opportunities from the downstream transmitter such that each periodic ranging opportunity is output
      after a first polling interval, discontinue the periodic ranging opportunities being output at the first polling interval and output the periodic ranging opportunities from the downstream transmitter such that each periodic ranging opportunity is output after a second polling interval that differs from the first polling interval after the upstream receiver fails to receive a periodic ranging request in response to a periodic ranging opportunity and until it is determined that a periodic ranging request has been received by the upstream receiver, and
      discontinue the periodic ranging opportunities being output at the second polling interval and output the periodic ranging opportunities at a third polling interval that differs from the first and second polling intervals if a total loss time that is equal to a count of the consecutive periodic ranging opportunities being output at the second polling interval that fail to result in a periodic ranging request being received into the upstream receiver multiplied by the second polling interval plus the first polling interval is within a predetermined margin from a disconnect interval for disconnecting a cable modem the is communicating with the upstream receiver.

12. A CMTS as recited in claim 11, wherein the predetermined margin is within a range that is 3 seconds shorter than the disconnect interval and longer than the disconnect interval.

13. A CMTS as recited in claim 12, wherein the disconnect interval is about 30 seconds.

14. A CMTS as recited in claim 11, wherein the first polling interval has a range that is between about 2 seconds shorter than the disconnect interval and about 20 seconds shorter than the disconnect interval, and the second polling interval has a range between about 0 seconds and about 10 seconds, and the third polling interval is shorter than the first polling interval and longer than the second polling interval.

15. A CMTS as recited in claim 14, wherein the third polling interval is 1 second shorter than the first polling interval.

16. A CMTS as recited in claim 11, wherein the first polling interval has a range that is between about 5 seconds shorter than the disconnect interval and about 10 seconds shorter than the disconnect interval, and the second polling interval has a range between about 0.5 second and about 1 second, and the third polling interval is shorter than the second polling interval.

17. A CMTS as recited in claim 14, wherein the third polling interval is 0.1 second shorter than the first polling interval.

18. A CMTS as recited in claim 11, wherein the first polling interval is selected to minimize a rate at which the periodic ranging opportunities are output at the first polling interval and selected such that the first polling interval plus the second polling interval are shorter than the disconnect interval, the third polling interval being shorter than the first or second polling intervals.

19. A CMTS as recited in claim 11, the processor being further arranged to:
   discontinue the periodic ranging opportunities being output at the third polling interval and outputting the periodic ranging opportunities such that each periodic ranging opportunity is output after the second polling interval if a periodic ranging request has not been received by the upstream receiver in response to the recently sent periodic ranging opportunity;
   clear the count of the consecutive periodic ranging opportunities, and
   discontinue the periodic ranging opportunities being output at the second interval and output the periodic ranging opportunities at a fourth polling interval that differs from the first, second, and third polling intervals if a total loss time that is equal to a count of the consecutive periodic ranging opportunities being output at the second polling interval that fails to result in a periodic range request received by the upstream receiver multiplied by the second polling interval plus the third polling interval is within the predetermined margin from the disconnect interval.

20. A CMTS as recited in claim 19, wherein the first polling interval has a range that is between about 2 seconds shorter than the disconnect interval and about 20 seconds shorter than the disconnect interval, the second polling interval has a range between about 0 and about 10 seconds, the third polling interval is shorter than the first polling interval and greater than the second polling interval, and the fourth polling interval is shorter than the third polling interval and greater than the second polling interval.

21. A CMTS as recited in claim 20, wherein the third polling interval is 1 second shorter than the first polling interval, and the fourth polling interval is 1 second shorter than the third interval.

22. A CMTS as recited in claim 20, wherein a first difference between the third and fourth polling intervals is more than a second difference between the third and first polling intervals.

23. A CMTS as recited in claim 11, the processor being further arranged to:
 clear the count of the consecutive periodic ranging opportunities, and
 discontinue the periodic ranging opportunities being output at the third polling interval and output the periodic ranging opportunities at a fourth polling interval that differs from the first, second, and third polling intervals if a total loss time that is equal to a count of the consecutive periodic ranging opportunities being sent at the third polling interval that fail to result in a period ranging request multiplied by the third polling interval plus the first polling interval is within the predetermined margin from the disconnect interval.

24. A CMTS as recited in claim 23, wherein the first polling interval has a range that is between about 2 seconds shorter than the disconnect interval and about 20 seconds shorter than the disconnect interval, the second polling interval has a range between about 0 and about 10 seconds, the third polling interval is shorter than the second polling interval, and the fourth polling interval is shorter than the third polling interval.

25. A CMTS as recited in claim 24, wherein the third polling interval is 0.1 second shorter than the first polling interval.

26. A CMTS as recited in claim 24, wherein a first difference between the third and fourth polling intervals is more than a second difference between the third and second polling intervals.

27. A CMTS as recited in claim 11, the processor being further arranged to allow the cable modem to disconnect if a response to the periodic ranging opportunities has consecutively failed to be received into the upstream receiver more than a predetermined maximum number of times.

28. A CMTS as recited in claim 27, wherein the cable modem is allowed to disconnect by discontinuing the outputting of the periodic ranging opportunities.

29. A CMTS as recited in claim 28, the processor being further arranged to output the periodic ranging opportunities at a fourth polling interval that differs from the first, second, and third polling intervals when the cable modem reconnects.

30. A CMTS as recited in claim 29, wherein the first polling interval has a range that is between about 2 seconds shorter than the disconnect interval and about 20 seconds shorter than the disconnect interval, the second polling interval has a range between about 0 and about 10 seconds, the third polling interval is shorter than the first polling interval and longer than the second polling interval, and the fourth polling interval is shorter than the third polling interval and longer than the second polling interval.

31. A CMTS as recited in claim 29, wherein the first polling interval has a range that is between about 5 seconds shorter than the disconnect interval and about 10 seconds shorter than the disconnect interval, the second polling interval has a range between about 0.5 and about 1 second, the third polling interval is shorter than the second polling interval, and the fourth polling interval is shorter than the third polling interval.

32. A computer implemented method for sending a periodic ranging opportunity to a cable modem, the method comprising:
 (a) sending a first periodic ranging opportunity to the cable modem after a first polling interval; and
 (b) sending a second periodic ranging opportunity to the cable modem after a second polling interval if the cable modem has not sent a periodic ranging request in response to the first periodic ranging opportunity, wherein the second polling interval is shorter than the first polling interval.

33. A method as recited in claim 32, wherein the first polling interval plus the second polling interval are less than a disconnect interval after which the cable modem disconnects.

34. A method as recited in claim 32, wherein the first polling interval has a range between about 2 seconds shorter than a disconnect interval after which the cable modem disconnects and about 20 seconds shorter than the disconnect interval, and the second polling interval is greater than zero and less than or equal to about 10 seconds.

35. A method as recited in claim 34, wherein the first polling interval has a range between about 5 seconds shorter than a disconnect interval after which the cable modem disconnects and about 10 seconds shorter than the disconnect interval, and the second polling interval is greater than 0.5 and less than or equal to about 1 second.

36. A method as recited in claim 32, wherein the first periodic ranging opportunity to the cable modem is sent after setting a maintenance timer to the first polling interval and after the maintenance timer expires.

37. A method as recited in claim 36, wherein the second periodic ranging opportunity to the cable modem is sent after setting a maintenance timer to the second polling interval and after the maintenance timer expires.

38. A method as recited in claim 32, further comprising sending a next periodic ranging opportunity to the cable modem after the first polling interval when the modem responds to the first periodic ranging opportunity.

39. A method as recited in claim 32, further comprising sending a next periodic ranging opportunity to the cable modem after the second polling interval when the modem fails to respond to the second periodic ranging opportunity.

40. A method as recited in claim 32, further comprising:
 sending a next periodic ranging opportunity to the cable modem after the second polling interval if the cable modem has not consecutively failed to respond to the first or second periodic ranging opportunity more than a predetermined maximum number of times; and
 allowing the cable modem to disconnect if the cable modem has consecutively failed to respond to the first or second periodic ranging opportunity more than the predetermined maximum number of times.

41. A method as recited in claim 40, wherein the cable modem is allowed to disconnect by discontinuing the sending of any periodic ranging opportunity to the cable modem.

42. A method as recited in claim 33, wherein the first polling interval is selected to minimize a rate at which the periodic ranging opportunities are sent at the first polling interval to the cable modem.

43. A computer implemented method for sending periodic ranging opportunities to a cable modem, the method comprising:

sending a plurality of periodic ranging opportunities to the cable modem such that each periodic ranging opportunity is sent after a first polling interval;

discontinuing the periodic ranging opportunities being sent at the first polling interval and sending the periodic ranging opportunities to the cable modem such that each periodic ranging opportunity is sent after a second polling interval that differs from the first polling interval after the cable modem fails to send a periodic ranging request in response to a periodic ranging opportunity and until it is determined that the cable modem has sent a periodic ranging request; and discontinuing the periodic ranging opportunities being sent at the second polling interval and sending the periodic ranging opportunities at a third polling interval that differs from the first and second polling intervals if a total loss time that is equal to a count of the consecutive periodic ranging opportunities being sent at the second polling interval that fail to result in a periodic ranging request from the cable modem multiplied by the second polling interval plus the first polling interval is within a predetermined margin from a disconnect interval for disconnecting the cable modem.

44. A method as recited in claim 43, wherein the predetermined margin is within a range that is 3 seconds shorter than the disconnect interval and longer than the disconnect interval.

45. A method as recited in claim 44, wherein the disconnect interval is about 30 seconds.

46. A method as recited in claim 43, wherein the first polling interval has a range that is between about 2 seconds shorter than the disconnect interval and about 20 seconds shorter than the disconnect interval, and the second polling interval has a range between about 0 second and about 10 seconds, and the third polling interval is shorter than the first polling interval and longer than the second polling interval.

47. A method as recited in claim 46, wherein the third polling interval is 1 second shorter than the first polling interval.

48. A method as recited in claim 43, wherein the first polling interval has a range that is between about 5 seconds shorter than the disconnect interval and about 10 seconds shorter than the disconnect interval, and the second polling interval has a range between about 0.5 and about 1 second, and the third polling interval is shorter than the second polling interval.

49. A method as recited in claim 46, wherein the third polling interval is 0.1 second shorter than the first polling interval.

50. A method as recited in claim 43, wherein the first polling interval is selected to minimize a rate at which the periodic ranging opportunities are sent at the first polling interval to the cable modem and selected such that the first polling interval plus the second polling interval are shorter than the disconnect interval of the cable modem, the third polling interval being shorter than the first or second polling intervals.

51. A method as recited in claim 43, further comprising:
discontinuing the periodic ranging opportunities being sent at the third polling interval and sending the periodic ranging opportunities to the cable modem such that each periodic ranging opportunity is sent after the second polling interval if the cable modem has not sent a periodic ranging request in response to the recently sent periodic ranging opportunity;

clearing the count of the consecutive periodic ranging opportunities; and discontinuing the periodic ranging opportunities being sent at the second interval and sending the periodic ranging opportunities at a fourth polling interval that differs from the first, second, and third polling intervals if a total loss time that is equal to a count of the consecutive periodic ranging opportunities being sent at the second polling interval that fails to result in a periodic range request from the cable modem multiplied by the second polling interval plus the third polling interval is within the predetermined margin from the disconnect interval for disconnecting the cable modem.

52. A method as recited in claim 51, wherein the first polling interval has a range that is between about 2 seconds shorter than the disconnect interval and about 20 seconds shorter than the disconnect interval, the second polling interval has a range between about 0 and about 10 seconds, the third polling interval is shorter than the first polling interval and greater than the second polling interval, and the fourth polling interval is shorter than the third polling interval and greater than the second polling interval.

53. A method as recited in claim 52, wherein the third polling interval is 1 second shorter than the first polling interval, and the fourth polling interval is 1 second shorter than the third interval.

54. A method as recited in claim 52, wherein a first difference between the third and fourth polling intervals is more than a second difference between the third and first polling intervals.

55. A method as recited in claim 43, further comprising:
clearing the count of the consecutive periodic ranging opportunities; and discontinuing the periodic ranging opportunities being sent at the third polling interval and sending the periodic ranging opportunities at a fourth polling interval that differs from the first, second, and third polling intervals if a total loss time that is equal to a count of the consecutive periodic ranging opportunities being sent at the third polling interval that fail to result in a period ranging request multiplied by the third polling interval plus the first polling interval is within the predetermined margin from the disconnect interval for disconnecting the cable modem.

56. A method as recited in claim 55, wherein the first polling interval has a range that is between about 2 seconds shorter than the disconnect interval and about 20 shorter than the disconnect interval, the second polling interval has a range between about 0 and about 10 second, the third polling interval is shorter than the second polling interval, and the fourth polling interval is shorter than the third polling interval.

57. A method as recited in claim 56, wherein the third polling interval is 0.1 second shorter than the first polling interval.

58. A method as recited in claim 56, wherein a first difference between the third and fourth polling intervals is more than a second difference between the third and second polling intervals.

59. A method as recited in claim 43, further comprising allowing the cable modem to disconnect if the cable modem has consecutively failed to respond to the periodic ranging opportunities more than a predetermined maximum number of times.

60. A method as recited in claim 59, wherein the cable modem is allowed to disconnect by discontinuing the sending of the periodic ranging opportunities to the cable modem.

61. A method as recited in claim 60, further comprising sending the periodic ranging opportunities at a fourth polling interval that differs from the first, second, and third polling intervals when the cable modem reconnects.

62. A method as recited in claim 61, wherein the first polling interval has a range that is between about 2 seconds shorter than the disconnect interval and about 20 seconds shorter than the disconnect interval, the second polling interval has a range between about 0 and about 10 seconds, the third polling interval is shorter than the first polling interval and longer than the second polling interval, and the fourth polling interval is shorter than the third polling interval and longer than the second polling interval.

63. A method as recited in claim 61, wherein the first polling interval has a range that is between about 5 seconds shorter than the disconnect interval and about 10 shorter than the disconnect interval, the second polling interval has a range between about 0.5 and about 1 second, the third polling interval is shorter than the second polling interval, and the fourth polling interval is shorter than the third polling interval.

64. A computer readable medium containing program instructions for sending a periodic ranging opportunity to a cable modem, the computer readable medium comprising:

(a) computer readable code for sending a first periodic ranging opportunity to the cable modem after a first polling interval; and (b) computer readable code for sending a second periodic ranging opportunity to the cable modem after a second polling interval if the cable modem has not sent a periodic ranging request in response to the first periodic ranging opportunity, wherein the second polling interval is shorter than the first polling interval.

65. A computer readable medium containing program instructions for sending periodic ranging opportunities to a cable modem, the computer readable medium comprising:

computer readable code for sending a plurality of periodic ranging opportunities to the cable modem such that each periodic ranging opportunity is sent after a first polling interval;

computer readable code for discontinuing the periodic ranging opportunities being sent at the first polling interval and sending the periodic ranging opportunities to the cable modem such that each periodic ranging opportunity is sent after a second polling interval that differs from the first polling interval after the cable modem fails to send a periodic ranging request in response to a periodic ranging opportunity and until it is determined that the cable modem has sent a periodic ranging request; and computer code for discontinuing the periodic ranging opportunities being sent at the second polling interval and sending the periodic ranging opportunities at a third polling interval that differs from the first and second polling intervals if a total loss time that is equal to a count of the consecutive periodic ranging opportunities being sent at the second polling interval that fail to result in a periodic ranging request from the cable modem multiplied by the second polling interval plus the first polling interval is within a predetermined margin from a disconnect interval for disconnecting the cable modem.

* * * * *